United States Patent Office 3,433,756
Patented Mar. 18, 1969

3,433,756
PROCESS FOR THE PRODUCTION OF HIGH MOLECULAR WEIGHT ESTERS OF A CARBOXYLIC ACID
Wolfgang Seeliger and Rudolf Nehring, Marl, Germany, assignors to Chemische Werke Huls Aktiengesellschaft, Marl, Germany, a corporation of Germany
No Drawing. Filed Oct. 29, 1965, Ser. No. 505,744
Claims priority, application Germany, Nov. 24, 1964, C 34,451
U.S. Cl. 260—22  3 Claims
Int. Cl. C08g 17/16; C08h 9/00; C08f 21/04

ABSTRACT OF THE DISCLOSURE

High molecular weight polyesters of carboxylic acids with (cyclo)-aliphatic diols are produced through polycondensation of a compound of the formula

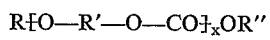

by heating the same in the presence of a specified fatty acid compound as catalyst.

---

It is known to prepare polyesters of carboxylic acids with (cyclo)aliphatic diols by reacting the diol with a dialkyl-, diaryl-, bisalkyl- or bisarylcarbonate of a diol. Moreover bisalkyl- and bisarylcarbonates of diols can be converted into polycarbonates by cleavage of dialkyl- and diarylcarbonates.

In these processes compounds of the following general formula are assumed to be intermediate products:

I   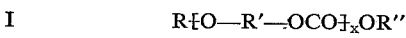

in which R stands for hydrogen or the COOR" group, R' stands for an aliphatic, araliphatic or cycloaliphatic radical having at least three adjacent carbon atoms positioned between two oxygen atoms and R" stands for an alkyl group having from 1 to 4 carbon atoms or a phenyl group and $x$ is a whole number from 1 to 100.

It is further known that only high molecular weight polycarbonates are produced by these prior processes when polycondensation is effected in the presence of strongly alkaline catalysts such as alkali and alkaline earth metals or their hydrides, oxides, amides and alcoholates or insoluble catalysts such as zinc oxide, antimony trioxide and lead oxide or complex compounds of titanium or zirconium. Large amounts of strongly alkaline catalysts give side reactions whereas acid catalysts are substantially ineffective.

(Cyclo)aliphatic polyester of carboxylic acid having useful synthetic resin properties can, as is known, be obtained only when strongly basic catalysts are used. These catalysts must however be neutralized at or near the end of the polycondensation in order to avoid a thermal decomposition of the polycarbonate. This can be done by dissolving the polycarbonate and treating it with hydrochloric acid or by the action of acid acting materials such as toluene sulfonic acid, dimethylsulfate or benzoyl chloride, the excess of which must be separated later.

These prior processes for the production of high molecular weight polycarbonates having useful synthetic resin properties are, technically, very expensive and give synthetic resins which, in general, are permeated by insoluble material such as sodium chloride and are therefore not transparent.

It has now been found that high molecular weight polyesters of carboxylic acids with (cyclo)aliphatic diols can be made with avoidance of the above-mentioned disadvantages by polycondensation of compounds of Formula I above, in which R, R', R" and $x$ have the same values, at elevated temperatures, preferably under reduced pressure and in the presence of catalysts, provided that fatty acids having from 6 to 21 carbon atoms or alkali metal or ammonium salts of such fatty acids or alkyl- or aralkylsulfonic acids having 6 to 21 carbon atoms in their alkyl groups or their low molecular weight condensation products with alkylolamines are used as catalysts.

All dihydroxy compounds whose hydroxyl groups are attached directly to carbon atoms that carry one hydrogen atom and are separated by at least two and preferably at least three carbon atoms and are of aliphatic or cycloaliphatic nature are suitable for use as diols for the production of these polyesters of carboxylic acids.

Examples of suitable diols are butanediol-(1,4), hexanediol-(1,6), octanediol-(1,8), octanediol-(2,6), dodecanediol-(1,12), cyclohexanediol-(1,3) and -(1,4), -,4- and 1,3-cyclohexanedimethanol, 3- and 4-hydroxymethyl-cyclohexanol-(1), o-, m- and p-bis-(2-hydroxyethyl)-benzene, hydroquinone-bis-(2-hydroxyethylether), 2,2-bis-(p-2-hydroxyethoxyphenyl)-propane and 2,2-(4,4'-dioxydicyclohexyl)-propane.

Examples of suitable catalysts are palmitic acid, stearic acid, lauric acid, oleic acid and their potassium, sodium and ammonium salts, also lithium, potassium, sodium and ammonium salts of tetrapropylene sulfonic acid, potassium dodecylbenzene sulfonate, sodium dodecylbenzene sulfonate, alkali metal salts of stearylalcohol sulfates, coconut oil fatty acid-diethanolamide, palmitic acid-ethanolamide, stearic acid-diethanolamide and mersolate soap (sodium alkanesulfonate) and mixtures thereof.

These catalysts preferably are used in anhydrous form or substantially free of water. They may be used in amounts within the range from 0.001 to 2% by weight, preferably from 0.005 to 0.5% by weight and may be added at the beginning or during the course of the polycondensation. In the latter case it is advisable to dissolve the catalyst in e.g. methanol.

The process of the invention preferably is carried out in such a way that a diol or a mixture of diols is reacted with a chloroformic acid ester of an aliphatic, monovalent alcohol having 1–4 carbon atoms in a molecular ratio within the range from 1:1 to 1:1.8 or with 0.5 to 1.5 moles of phosgene in the presence of 0.1 to 0.9 mole of a chloroformic acid ester of a monovalent aliphatic alcohol having 1–4 carbon atoms, the sum of the moles of phosgene and chloroformic acid ester used being from 1.0 to 1.6. The precondensate remaining after vaporization of volatile components is then polycondensed at elevated temperature, usually under reduced pressure and in a stream of inert gas in the presence of the catalysts described above. No patent protection is claimed in this application for the preparation of the precondensate referred to above.

The process of the present invention may be carried out in such a way that e.g. the bisalkyl- or bisaryl derivative of the diol is polycondensed in the presence of the specified catalyst.

It may be advantageous to precondense the diol with the dialkyl- or diarylcarbonate in the presence of a strongly alkaline catalyst e.g. up to a K-value of 10 to 30 and then to complete the condensation after the addition of a high molecular weight carboxylic acid such as stearic, palmitic or lauric acid which suitably may be added in excess.

This procedure differs basically from the known neutralization of the strongly basic catalysts. Whereas in the known neutralization, the basic catalysts are made inactive when the desired degree of polycondensation is nearly reached in order to avoid thermal decomposition, in the present process the strongly basic catalyst is converted into a catalyst that remains active and which does not catalyze the thermal decomposition and therefore need not be separated or rendered inactive.

In the method of the present invention the catalysts e.g. the carboxylic acids are added suitably in excess and due to the better mixing, advantageously before reaching the final viscosity.

The high molecular weight (cyclo)-aliphatic polycarbonates of the present invention generally are as clear as glass and due to thermal stability are readily used in their molten state to produce thermoplastic molded bodies, filaments, films and coatings. Also due to their good solubility in many solvents and their compatibility with other polymers they may be used alone or mixed with other polymers in solution as lacquer bases.

Since the interchange of ester radicals in the process of the present invention takes place according to an ionic mechanism it must be assumed that the activity of the catalysts depends upon its capacity to form alcoholate anions e.g. due to greater basicity or complex forming ability. It was therefore not foreseeable that the catalysts of the present invention as a rule possess a greater catalytic activity than the previously used strong basic catalysts.

Further, it was surprising that the thermal decomposition of the polycarbonate did not occur in the presence of the catalysts of the present invention and therefore need not be separated from the reaction product whereas other strongly basic, neutral and weakly acid materials cause a thermal decomposition. A further advantage of the process of the present invention is that due to the avoidance of thermal decomposition a practically constant viscosity value may be attained which depends entirely upon the kind and concentration of the catalyst and thus makes possible a regulation of the molecular weight of the product.

The following examples serve only to illustrate the invention.

A. Precondensation 2884 parts by weight of cyclohexane-dimethanol-(1,4) were mixed in a vessel having five tubes with 370 parts by weight of ethyl alcohol with heating and the mixture was then cooled to about 10° C. 2400 parts by weight of phosgene were introduced simultaneously through three tubes into the alcoholic cyclohexane dimethanol-1,4 solution. If the alcohol contains any water a corresponding additional amount of phosgene must be introduced. The mixture was vigorously stirred while maintaining the mixture at 10° C. by external cooling with an ice and water mixture. After about 20 hours the phosgene was all reacted. Toward the end of the reaction hydrogen chloride was evolved. In order to complete the removal of the hydrogen chloride nitrogen was passed through the mixture for 2 hours at room temperature and then for 5 hours at 50° C. Then the mixture was heated up within an hour to 120° C. and maintained at this temperature for 2 hours. Then in order further to reduce the hydrogen chloride content the mixture was cooled, 300 parts by weight of ethanol were added, the mixture was heated again to 120° C. and nitrogen was passed for 1 hour with stirring at this temperature. Then for another hour the alcohol was removed by distillation at 20 torr. This last procedure involving the addition of 300 parts by weight of ethanol was repeated. The product of the foregoing procedure was 3670 parts by weight of a precondensate having a chlorine content of less than 0.25%. $\eta_{red}=0.1$. This precondensate was maintained for 3 hours at 170–200° C. and 2 torr in an atmosphere of nitrogen.

B. Polycondensation 100 parts by weight batches of the precondensate prepared as described above were mixed with the catalysts shown in the following table in the amounts indicated, advantageously dissolved in methanol. The precondensate and catalyst were thoroughly mixed and then heated to 255° C. at a pressure of 3.5 torr in an atmosphere of nitrogen. Volatile products such as ethyl alcohol and diethylcarbonate were separated by distillation.

The technical progress made by the present invention is apparent from the comparisons shown in the table for the catalysts of the invention (Examples 1–7) and for the heretofore known or operable catalysts (Examples 9–16). Example 8 illustrates an uncatalyzed polycondensation.

TABLE.—POLYCONDENSATION OF A PRECONDENSATE MADE AS DESCRIBED UNDER A, ABOVE, IN VACUUM AT ABOUT 255° C. WITH THE VARIOUS CATALYSTS INDICATED

| Example | Catalyst | Amount of catalyst | | $\eta$ Red after 2 std. | $\eta$ Red after 4 std. | $\eta$ Red after 6 std. | Transparency [1] |
|---|---|---|---|---|---|---|---|
| | | Wt. percent | mM/100 g. precondensate | | | | |
| 1 | K-palmitate | 0.11 | 0.36 | 0.60 | 0.61 | 0.61 | Very good. |
| 2 | K-palmitate [2] | 0.32 | 1.08 | 0.72 | 0.73 | 0.72 | Do. |
| 3 | Na-palmitate | 0.042 | 0.15 | | 0.58 | 0.59 | Good. |
| 4 | Palmitic acid | 0.19 | 0.73 | | 0.54 | 0.53 | Very good. |
| 5 | K-dodecylbenzene-sulfonate | 0.39 | 1.08 | 0.60 | 0.60 | 0.60 | Good. |
| 6 | K-tetrapropylene-benzenesulfonate | 0.39 | 1.08 | 0.59 | 0.58 | 0.59 | Do. |
| 7 | Coconut oil acid diethanolamide | 0.22 | 0.73 | | 0.49 | 0.50 | Do. |
| 8 | (Without catalyst) | | | 0.21 | 0.29 | 0.31 | Very good. |
| 9 | Na-methylate [2] | 4.2 10⁻³ | 0.18 | 0.16 | 0.19 | 0.20 | Good. |
| 10 | Na-methylate | 0.025 | 1.08 | 0.28 | 0.60 | 0.47 | Bad. |
| 11 | Ti-tetrabutylate | 0.03 | 0.09 | 0.31 | 0.36 | 0.46 | Do. |
| 12 | K-acetate [2] | 0.11 | 1.08 | 0.30 | 0.32 | 0.31 | Do. |
| 13 | MgO [3] | 0.83 | 21 | 0.17 | 0.18 | 0.23 | Do. |
| 14 | KOH | 0.049 | 0.87 | 0.49 | 0.38 | 0.30 | Do. |
| 15 | MgCl₂·6H₂O | 0.15 | 0.73 | | 0.53 | 0.41 | Do. |
| 16 | KI | 0.12 | 0.73 | 0.43 | 0.41 | 0.39 | Do. |

[1] Transparency measured on a plate 2 cm. thick; very good means glass clear; good means transparent but somewhat cloudy; bad means opaque or having inclusions.
[2] Polycondensation carried out at 190° C.
[3] In the form of rodlets.

A suitable temperature range for the polycondensation is from 150 to 280° C. and a suitable pressure range is from 30 to 1.10⁻² torr.

We claim:
1. Process for the production of a high molecular weight polyester of a carboxylic acid with a (cyclo)-aliphatic diol which comprises polycondensing a compound of the general formula

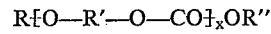

R[O—R'—O—CO]$_x$OR'' in which R stands for a member selected from the group consisting of H and —COOR'', R' stands for a member selected from the group consisting of aliphatic, araliphatic and cycloaliphatic groups having at least three adjacent carbon atoms between the two oxygen atoms, R'' stands for a member selected from the group consisting of alkyl groups having from 1 to 4 carbon atoms and the phenyl group and $x$ is a number from 1 to 100 by heating said compound in the presence of a catalyst selected from the group consisting of fatty acids containing from 6 to 21 carbon atoms, their alkali metal and ammonium salts, and their low molecular weight condensation products with alkanolamines, alkali metal and ammonium salts of alkyl and arylsulfonic acids having from 6 to 21 carbon atoms in their alkyl groups, and mixtures thereof, in amounts within the range of from 0.001 to 2% by weight.

2. Process as defined in claim 1 in which the polycondensation is carried out at a temperature within the range from 150 to 280° C. and at a pressure within the range from 30 to $1.10^{-2}$ torr.

3. Process as defined in claim 1 in which the polycondensation is carried out using the catalyst in an amount within the range from 0.005 to 0.5% by weight.

References Cited

UNITED STATES PATENTS

| | | | |
|---|---|---|---|
| 3,062,780 | 11/1962 | Rinke et al. | 260—47 |
| 3,083,182 | 3/1963 | Matsukane et al. | 260—47 |
| 3,133,044 | 5/1964 | Allen et al. | 260—47 |
| 3,143,525 | 8/1964 | Ott | 260—47 |
| 3,157,606 | 11/1964 | Deanin et al. | 260—47 |
| 3,177,179 | 4/1965 | Lee et al. | 260—47 |
| 3,255,230 | 6/1966 | Kurkjy et al. | 260—47 |

DONALD E. CZAJA, *Primary Examiner.*

R. W. GRIFFIN, *Assistant Examiner.*

U.S. Cl. X.R.

260—30.8, 32.4, 47, 75